(12) United States Patent
Fithian et al.

(10) Patent No.: US 9,830,505 B2
(45) Date of Patent: Nov. 28, 2017

(54) IDENTIFYING AND OBSCURING FACES OF SPECIFIC INDIVIDUALS IN AN IMAGE

(71) Applicant: International Business Machines Corporation, Armonk, NY (US)

(72) Inventors: Rachel H. Fithian, Raleigh, NC (US); Hugh E. Hockett, Raleigh, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/539,606

(22) Filed: Nov. 12, 2014

(65) Prior Publication Data

US 2016/0132719 A1 May 12, 2016

(51) Int. Cl.
*G06K 9/00* (2006.01)
*G06F 17/30* (2006.01)
*G06K 9/62* (2006.01)

(52) U.S. Cl.
CPC ... *G06K 9/00288* (2013.01); *G06F 17/30268* (2013.01); *G06K 9/6256* (2013.01)

(58) Field of Classification Search
CPC .............................................. G06K 9/00288
See application file for complete search history.

(56) References Cited

U.S. PATENT DOCUMENTS

| | | | |
|---|---|---|---|
| 8,488,848 B2 * | 7/2013 | Acosta-Cazaubon | G06Q 30/0241 340/5.1 |
| 8,798,401 B1 * | 8/2014 | Johnson | G06F 17/30244 382/305 |
| 2007/0153091 A1 | 7/2007 | Watlington et al. | |
| 2009/0217342 A1 | 8/2009 | Nadler | |
| 2011/0202968 A1 | 8/2011 | Nurmi | |
| 2011/0283309 A1 * | 11/2011 | Bliss | H04N 21/4532 725/25 |
| 2012/0246484 A1 | 9/2012 | Blaisdell et al. | |
| 2012/0250951 A1 | 10/2012 | Chen | |

(Continued)

OTHER PUBLICATIONS

Anonymous, "Enhanced Picture Privacy in Social Networking Environment", published Jan. 18, 2011, 3 pages.

(Continued)

*Primary Examiner* — Kee M Tung
*Assistant Examiner* — Grace Q Li
(74) *Attorney, Agent, or Firm* — Scully, Scott, Murphy & Presser, P.C.; Nicholas D. Bowman, Esq.

(57) ABSTRACT

Identifying and obscuring faces of specific individuals in an image may be provided. A request for an image for display on a computer display device may be received from a viewing user. One or more individuals represented in the image may be automatically determined using an image processing technique. A target individual may be identified from the one or more individuals whose facial image is to be obscured when displaying the image based an access control level associated with the viewing user and one or more criteria associated with the target individual. Responsive to the identifying, a customized image may be generated by obscuring a region having the facial image of the target individual from the image. The customized image may be transmitted for display.

19 Claims, 3 Drawing Sheets

(56) References Cited

U.S. PATENT DOCUMENTS

| | | | | |
|---|---|---|---|---|
| 2013/0236070 A1* | 9/2013 | Sliwinski | ........... | G06K 9/00221 |
| | | | | 382/118 |
| 2014/0168477 A1* | 6/2014 | David | ................ | G06Q 30/0601 |
| | | | | 348/240.2 |
| 2014/0280354 A1* | 9/2014 | Giuffrida | .......... | G06F 17/30241 |
| | | | | 707/796 |
| 2014/0355821 A1* | 12/2014 | Solem | ................... | G06T 7/0046 |
| | | | | 382/103 |
| 2014/0362075 A1* | 12/2014 | Howell | .................. | G06T 19/20 |
| | | | | 345/419 |
| 2015/0047050 A1* | 2/2015 | Das | ........................ | G06F 21/10 |
| | | | | 726/26 |
| 2015/0113661 A1* | 4/2015 | Mishra | ................ | G06F 21/6245 |
| | | | | 726/26 |

OTHER PUBLICATIONS

Anonymous, "Use of Facial Recognition to Enable Privacy in Social Networks", published Aug. 7, 2012, 10 pages.

Anonymous, "The Partial Content Editing Mechanism for Social Network", published May 14, 2013, 6 pages.

Frome, A., et al., "Large-scale Privacy Protection in Google Street View", Computer Vision, 2009 IEEE 12th International Conference, Date of Conference: Sep. 29, 2009-Oct. 2, 2009, pp. 2373-2380, Conference Location: Kyoto.

Magid, L., "YouTube Launches Feature to Blur Faces in Videos", Jul. 18, 2012, 5 pages, http://www.forbes.com/sites/larrymagid/2012/07/18/youtube-launches-feature-to-obscure-faces-in-videos/.

* cited by examiner

IDENTIFYING AND OBSCURING FACES OF SPECIFIC INDIVIDUALS IN AN IMAGE

FIELD

The present application relates generally to computers and computer applications, and more particularly to online social media, big data analytics, privacy settings and identifying and obscuring faces of specific individuals in an image.

BACKGROUND

Use of photo and video images abound, for example, in online social media and social networks. People record images of events throughout their day and often share these images online so that others can enjoy them. However, people often capture other people whom they do not necessarily know in their images, e.g., because they are part of a background of a scene. A parent might have concerns about pictures or videos of their children being posted online via a wide assortment of sources: sports teams, school functions, birthday parties, and others. The parent may or may not know that a picture has even been posted online, so it is difficult to keep track of where a child has been featured online. There is not currently a way to identify and filter a portion or particular region of an image posted on an online outlet to protect the privacy of a specific person.

BRIEF SUMMARY

A method and system of identifying and obscuring faces of specific individuals in an image may be provided. The method, in one aspect, may comprise receiving a request for an image for display on a computer display device from a viewing user. The method may also comprise determining automatically by a processor one or more individuals represented in the image using an image processing technique. The method may further comprise identifying a target individual from the one or more individuals whose facial image is to be obscured when displaying the image based an access control level associated with the viewing user and one or more criteria associated with the target individual. The method may also comprise responsive to the identifying, generating a customized image by obscuring a region having the facial image of the target individual from the image. The method may also comprise transmitting the customized image for display.

A system of identifying and obscuring faces of specific individuals in an image, in one aspect, may comprise a processor operable to receive a request for an image for display on a computer display device from a viewing user. The processor may be further operable to determine one or more individuals represented in the image using an image processing technique. The processor may be further operable to identify a target individual from the one or more individuals whose facial image is to be obscured when displaying the image based on an access control level associated with the viewing user and one or more criteria associated with the target individual. Responsive to the identifying, the processor may be further operable to generate a customized image by obscuring a region having the facial image of the target individual from the image. The processor may be further operable to transmit the customized image for display. A storage device may be operable to store the image, the customized image and metadata associated with the customized image.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques are disclosed that may provide a methodology, service and/or system to dynamically analyze, filter and modify computer-rendered image contents based on a permission set by a user and access rights of the image viewer. For instance, a parent or guardian may utilize the methodology to protect privacy of a child. The methodology or service may be implemented as a centralized or site specific function.

In one embodiment, one or more access rules may be defined for portions of any image that contains a specific person. Access rules may be enforced for a portion of an image containing a specific person, even for images unknown to the person. In one embodiment, an image filter is provided that obscures the face of a specific individual in an image. An image may be displayed with some faces visible, and other faces hidden depending on the viewer of the image.

A methodology of the present disclosure in one embodiment may dynamically render an image with some faces obscured and others visible, based on user preference. The image may potentially be rendered differently for each online user that views the image.

Figure 1:
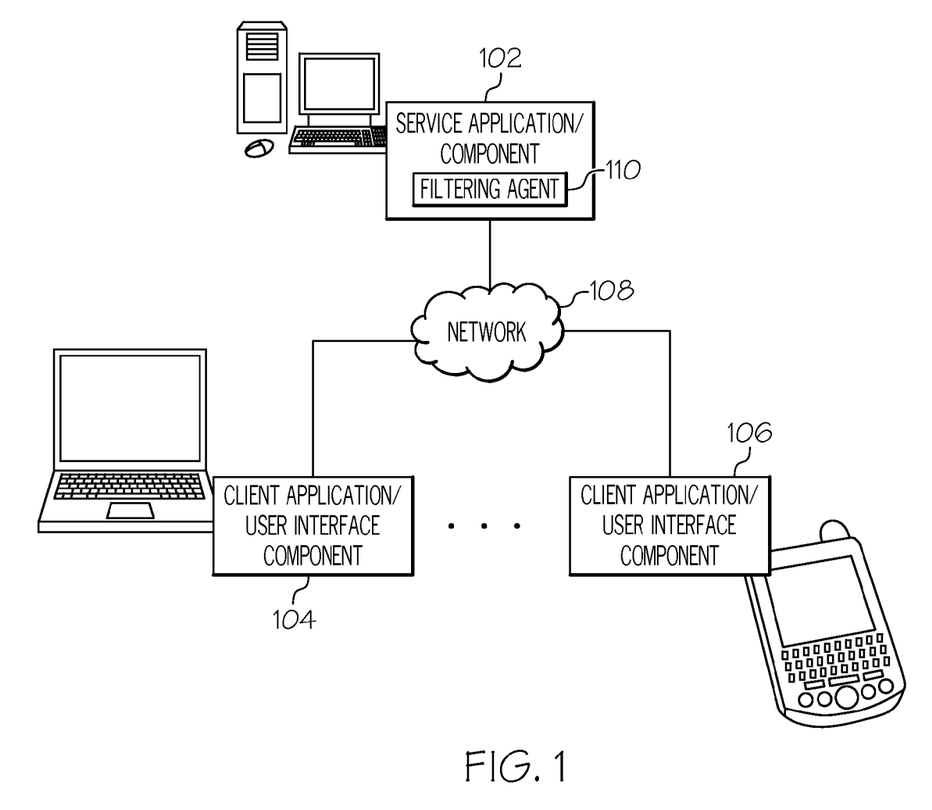
FIG. 1 is a diagram illustrating components for identifying obscuring specific individuals in an image in one embodiment of the present disclosure.

FIG. 1 is a diagram illustrating components for identifying obscuring specific individuals in an image in one embodiment of the present disclosure. A client component may include a client application such as a user interface (e.g., 104, 106) running on a processor, e.g., a user computer, via which a user may log into an account for an online service 102, e.g., via a network 108. Via the user interface (e.g., 104, 106), a user may indicate a target user which requires a privacy setting. For instance, a parent as a user may set a privacy or policy setting for a child as a target user. Via the client application or user interface (e.g., 104, 106), a user may upload a training set of pictures to the service 102 to allow the service 102 to learn and identify the target user in images. The service 102 also may derive additional images of the target user based on existing image tags of the target user available on service 102. Via the client application or user interface (e.g., 104, 106), a user may set default levels of privacy for images of the target user. For instance, default levels may specify that an image of the target user is publically viewable, viewable by specific people only, or never viewable. The privacy settings may be changed for a specific image.

The client application (e.g., 104, 106) may include a user interface which provides input fields for a user to specify the privacy or policy setting, upload images for training, and to otherwise interact with the service 102.

A service function 102 may run on one or more processors and provide services for identifying and obscuring specific regions or faces in images. For example, a service function 102 may receive a request from a user, via a client application 104, for image. In response, the service function may retrieve original image from storage, and for example, pass control of image to a filtering agent 110. A filtering agent 110 may determine individuals are represented in the image, for example, using facial recognition technique. In another aspect, the filtering agent 110 may use image tagging technique, which has images tagged with identifiers, to determine individuals in the image. The filtering agent 110 may determine whether any of the individuals in the image need to be obscured, based on one or more criteria, for example, which may be specified in privacy settings and/or policy settings. Examples of criteria may include an access control list (ACL) to determine a particular user's rights to view an individual in the image, relationships between individuals in the image, and others. For instance, a policy setting may indicate that user A is authorized to view a subset of faces in a particular image, but user B is not authorized so the faces will appear obscured. Similarly, a policy setting may indicate that target user A can be shown in the image if user B also appears in the image, however, target user A should not be shown in the image if user C appears in the image. Other rules may be specified. An anonymous user may still have some rights, e.g., depending on each policy setting.

The filtering agent 110 determines facial coordinates of the faces in the image that are to be obscured, and obscures the faces of individuals that user is not authorized to view by obscuring the area of the determined image coordinates. Obscuring may be done by pixelating facial area (region of the determined coordinates), or by replacing that region with other image renderings. Pixelating technique for example clumps up or combines pixel values so as to distort the image represented by the pixels. The custom rendered image (image with obscured region or area) may be served to the user. For instance, the service application 102 may transmit the custom rendered image over a network 108 to a requesting client application (e.g., 104, 106).

In one aspect, a service application 102 may cache the rendered image result (obscured image) and metadata for future use. For instance, results of facial recognition analysis may be stored for future render operations. Therefore, in one aspect, analysis steps may only be completed once. In another aspect, the obscuring process may be performed at the time an image is uploaded to the service application 102.

A service application 102 also receives images uploaded by a user and stores them, e.g., in a database associated or allocated for the user. Responsive to receiving an image uploaded from a user, for example, via a client application (e.g., 104, 106), a service application 102 may perform the following functions. For instance, a service application 102 may run a facial recognition module or technique on the image to determine location and identify of faces in the image. A service application 102 may store the results of the facial recognition module as metadata, for example, to reduce time required in obscuring faces in the image for processing future requests from a user for the image.

A client application (e.g., 104, 106) may also include an image viewer function as part of a user interface. For example, such image viewer function may send a request to a service application for an image based on user input, receive an obscured version of the image from a service application 102, and render the obscured version of the image, for example, which is rendered based on viewing rights of the individuals in that picture. As an example, an image of a class photograph, a viewing or requesting user may only view of the faces in the photograph.

While the above description described a client application and service application separately, it should be understood that the functionalities described above may be implemented in one application. For instance, some or all of the functionalities may be performed at a user computer locally.

Example use of the methodologies or service of the present disclosure may be in applications such as a social networking application where users upload images and the social networking application displays images on a user's profile page. Service application 102 may be a part of a social networking application. Client application (e.g., 104, 106) may be a user browser that opens a web page of the social networking application for allowing users to interact with the social networking application. Other uses for the methodologies or service of the present disclosure are contemplated.

Figure 2:
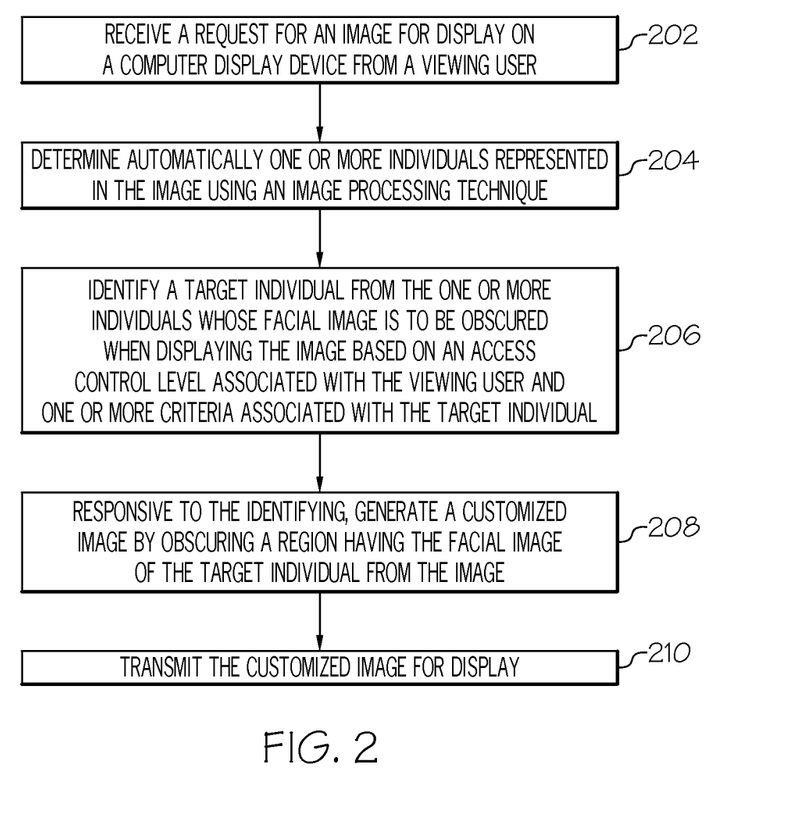
FIG. 2 is a flow diagram illustrating a method of identifying and obscuring specific regions in an image in one embodiment of the present disclosure.

FIG. 2 is a flow diagram illustrating a method of identifying and obscuring specific regions in an image in one embodiment of the present disclosure. At 202, a request is for an image for display on a computer display device from a viewing user, for example, via a client application or a browser. At 204, or more individuals represented in the image may be determined automatically by a service or application running on a computer processor using an image processing technique such as a facial recognition technique, image tagging technique and/or other techniques. At 206, the application running on a computer processor may identify a target individual from the one or more individuals whose facial image is to be obscured when displaying the image. This identification may be based an access control level associated with the viewing user and one or more criteria associated with the target individual. At 208, responsive to identifying one or more target individuals, the application running on a computer processor may generate a customized image, e.g., by obscuring a region having the facial image of the target individual from the image. An image or a region of an image may be obscured, for example, by pixelating the region or using another image rendering technique that replaces the facial image portion of the image. At 210, the customized image may be transmitted for display, for example, to the viewing user's computer display device, for example, via a client application or a browser. The customized image and metadata associated with the customized image may be saved or cached in a memory or storage.

As described above, one or more criteria associated with the target individual may include various privacy or policy settings, and may include at least which other one or more individuals are represented in the image together with the identified target individual. For example, a criterion may specify that if the target individual appears in the image with individual A, then do not obscure. As another example, a criterion may specify that if the target individual appears in the image with other one or more individuals with certain characteristics, then obscure the image of target individuals, and so forth. In this way, the customized image may be rendered differently for different viewing users as well as which individuals appear in an image with the target individual.

In one aspect, the access control level associated with the user and the one or more criteria associated with the target individual are configurable by one or more of the target individual and a user authorized to act on behalf of the target individual. For example, the target individual may set the policies. As another example, individuals such as a parent on behalf of a child may set the policies.

In another aspect, as described above, a training set of images may be received and used for learning to recognize the one or more individuals, for example, used in the image processing technique for recognizing individuals in an image.

Yet in another aspect, one or more individuals represented in the image may be determined at the time the image is initially uploaded, or previously to receiving the request from a viewing user.

Figure 3:
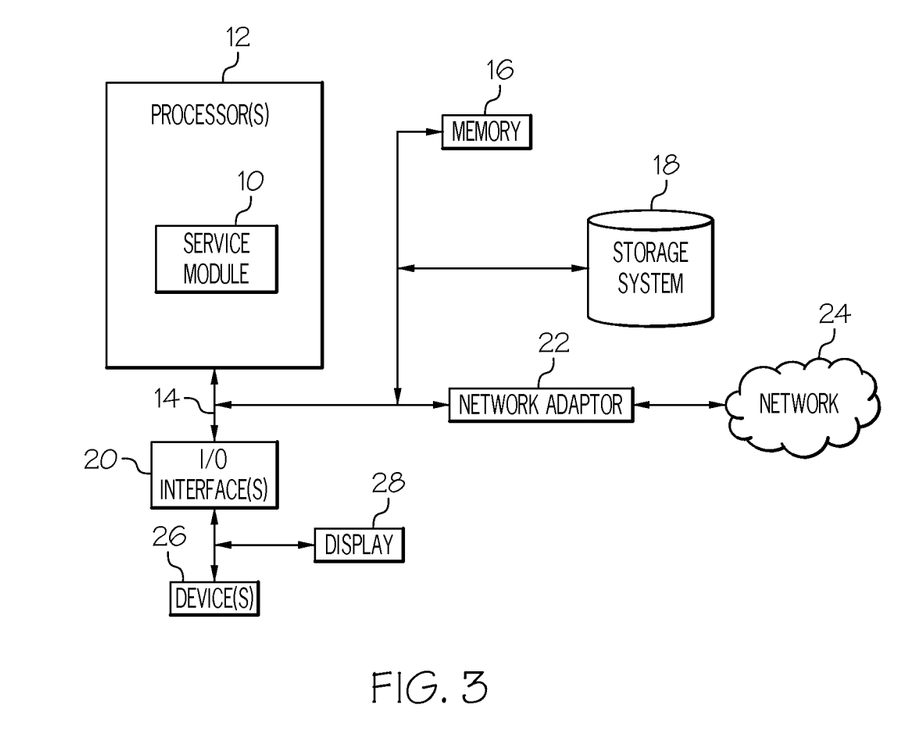
FIG. 3 illustrates a schematic of an example computer or processing system that may implement a facial image obscuring system in one embodiment of the present disclosure.

FIG. 3 illustrates a schematic of an example computer or processing system that may implement a facial image obscuring system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of identifying and obscuring faces of specific individuals in an image, comprising:
receiving a request for an image comprising computer-rendered image content for display on a computer display device from a viewing user, the request received by a social network application running on a server;

determining automatically by a processor associated with the server running the social network application one or more individuals represented in the image using an image processing technique;

identifying a target individual from the one or more individuals whose facial image is to be obscured when displaying the image based on access control level associated with the viewing user and one or more criteria associated with the target individual, the one or more criteria comprising an access control list that determines a particular user's rights to view the target individual in the image and relationships between the one or more individuals in the image, wherein based on the particular user's rights to view the target individual in the image and the relationships between one or more individuals in the image, the facial image is determined to be obscured or not obscured, the access control list providing a selective list of viewers with access levels that indicate who in the selective list can or cannot view the target individual in the image, the access control list further specifying that the target individual can be shown in the image if a first specified individual also appears in the image and that the target individual cannot be shown in the image if a second specified individual also appears in the image;

responsive to the identifying, generating a customized image by obscuring a region having the facial image of the target individual from the image by combining pixel values of at least a portion of the facial image to distort the image represented by pixels on the display device; and transmitting the customized image for display, the image rendered differently for the viewing user than for another viewing user based on different access rights of the viewing user and said another viewing user.

2. The method of claim 1, wherein the one or more criteria associated with the target individual comprises at least which other one or more individuals are represented in the image.

3. The method of claim 1, wherein the access control level associated with the user and the one or more criteria associated with the target individual are configurable by one or more of the target individual and a user authorized to act on behalf of the target individual.

4. The method of claim 1, wherein the image processing technique comprises one or more of facial recognition technique and image tagging technique.

5. The method of claim 1, further comprising receiving a training set of images for learning to recognize the one or more individuals, wherein the training set of images are used in the image processing technique.

6. The method of claim 1, further comprising caching the customized image and metadata associated with the customized image in storage.

7. The method of claim 1, wherein the determining of said one or more individuals represented in the image is performed responsive to the image being uploaded.

8. The method of claim 1, wherein the obscuring comprises pixelating the region of the image.

9. A computer readable storage medium storing a program of instructions executable by a machine to perform a method of identifying and obscuring faces of specific individuals in an image, the method comprising:

receiving a request for an image for display on a computer display device from a viewing user;

determining automatically by a processor one or more individuals represented in the image using an image processing technique;

identifying a target individual from the one or more individuals whose facial image is to be obscured when displaying the image based an access control level associated with the viewing user and one or more criteria associated with the target individual, the one or more criteria comprising an access control list that determines a particular user's rights to view the target individual in the image and relationships between the one or more individuals in the image, wherein based on the particular user's rights to view the target individual in the image and the relationships between one or more individuals in the image, the facial image is determined to be obscured or not obscured, the access control list providing a selective list of viewers with access levels that indicate who in the selective list can or cannot view the target individual in the image, the access control list further specifying that the target individual can be shown in the image if a first specified individual also appears in the image and that the target individual cannot be shown in the image if a second specified individual also appears in the image;

responsive to the identifying, generating a customized image by obscuring a region having the facial image of the target individual from the image by combining pixel values of at least a portion of the facial image to distort the image represented by pixels on the display device; and transmitting the customized image for display, the image rendered differently for the viewing user than for another viewing user based on different access rights of the viewing user and said another viewing user.

10. The computer readable storage medium of claim 9, wherein the one or more criteria associated with the target individual comprises at least which other one or more individuals are represented in the image.

11. The computer readable storage medium of claim 9, wherein the access control level associated with the user and the one or more criteria associated with the target individual are configurable by one or more of the target individual and a user authorized to act on behalf of the target individual.

12. The computer readable storage medium of claim 9, wherein the image processing technique comprises one or more of facial recognition technique and image tagging technique.

13. The computer readable storage medium of claim 9, further comprising receiving a training set of images for learning to recognize the one or more individuals, wherein the training set of images are used in the image processing technique.

14. The computer readable storage medium of claim 9, further comprising caching the customized image and metadata associated with the customized image in storage.

15. The computer readable storage medium of claim 9, wherein the determining of said one or more individuals represented in the image is performed responsive to the image being uploaded.

16. The computer readable storage medium of claim 9, wherein the obscuring comprises pixelating the region of the image.

17. A system of identifying and obscuring faces of specific individuals in an image, comprising:

a processor operable to receive a request for an image for display on a computer display device from a viewing user, the processor further operable to determine one or more individuals represented in the image using an image processing technique, the processor further operable to identify a target individual from the one or more individuals whose facial image is to be obscured when displaying the image based on an access control level associated with the viewing user and one or more criteria associated with the target individual, the one or more criteria comprising an access control list that determines a particular user's rights to view the target individual in the image and relationships between the one or more individuals in the image, wherein based on the particular user's rights to view the target individual in the image and the relationships between one or more individuals in the image, the facial image is determined to be obscured or not obscured, the access control list providing a selective list of viewers with access levels that indicate who in the selective list can or cannot view the target individual in the image, the access control list further specifying that the target individual can be shown in the image if a first specified individual also appears in the image and that the target individual cannot be shown in the image if a second specified individual also appears in the image, responsive to the identifying, the processor further operable to generate a customized image by obscuring a region having the facial image of the target individual from the image by combining pixel values of at least a portion of the facial image to distort the image represented by pixels on the display device, the processor further operable to transmit the customized image for display; and a storage device operable to store the image, the customized image and metadata associated with the customized image, the image rendered differently for the viewing user than for another viewing user based on different access rights of the viewing user and said another viewing user.

18. The system of claim 17, wherein the one or more criteria associated with the target individual comprises at least which other one or more individuals are represented in the image.

19. The system of claim 17, wherein the access control level associated with the user and the one or more criteria associated with the target individual are configurable by one or more of the target individual and a user authorized to act on behalf of the target individual.

* * * * *